US012777215B2

(12) United States Patent
Avni et al.

(10) Patent No.: US 12,777,215 B2
(45) Date of Patent: Oct. 27, 2026

(54) VIDEO TRANSMISSION SYSTEM AND METHOD

(71) Applicant: Zixi LLC, Waltham, MA (US)

(72) Inventors: Uri Avni, Tel Aviv (IL); Oded Gants, Revava (IL)

(73) Assignee: Zixi LLC, Waltham, MA (US)

( * ) Notice: Subject to any disclaimer, the term of this patent is extended or adjusted under 35 U.S.C. 154(b) by 0 days.

(21) Appl. No.: 19/636,628

(22) Filed: Apr. 1, 2026

(65) Prior Publication Data

US 2026/0313183 A1 Oct. 8, 2026

Related U.S. Application Data

(60) Provisional application No. 63/782,733, filed on Apr. 3, 2025.

(51) Int. Cl.

| | |
|---|---|
| ***H04N 21/2662*** | (2011.01) |
| ***H04N 21/238*** | (2011.01) |
| ***H04N 21/24*** | (2011.01) |
| ***H04N 21/647*** | (2011.01) |

(52) U.S. Cl.

CPC ....... *H04N 21/2662* (2013.01); *H04N 21/238* (2013.01); *H04N 21/2402* (2013.01); *H04N 21/64792* (2013.01)

(58) Field of Classification Search

CPC ............. H04N 21/2662; H04N 21/238; H04N 21/2402; H04N 21/64792

See application file for complete search history.

(56) References Cited

U.S. PATENT DOCUMENTS

| | | | | |
|---|---|---|---|---|
| 10,116,989 | B1 | 10/2018 | Shen et al. | |
| 12,593,058 | B2 | 3/2026 | Skupin et al. | |
| 2006/0227868 | A1 | 10/2006 | Chen et al. | |
| 2007/0014364 | A1 | 1/2007 | Kue-hwan | |
| 2007/0201500 | A1 | 8/2007 | Deshpande | |
| 2008/0259799 | A1 | 10/2008 | van Beek | |
| 2011/0170447 | A1 | 7/2011 | Kampmann et al. | |
| 2011/0252155 | A1* | 10/2011 | Parekh | H04N 21/23406 709/236 |
| 2013/0058406 | A1 | 3/2013 | Ye et al. | |
| 2020/0221147 | A1 | 7/2020 | Batra et al. | |
| 2023/0062704 | A1 | 3/2023 | Rosner et al. | |
| 2024/0312211 | A1* | 9/2024 | Chen | G06V 10/7715 |
| 2024/0314216 | A1 | 9/2024 | Muddukrishna et al. | |
| 2025/0080755 | A1 | 3/2025 | Sabeh et al. | |
| 2025/0141469 | A1 | 5/2025 | Cooper et al. | |
| 2025/0150895 | A1* | 5/2025 | Wong | H04W 28/0236 |
| 2025/0184579 | A1* | 6/2025 | Chen | H04N 21/2625 |
| 2025/0373492 | A1 | 12/2025 | Zhou et al. | |

* cited by examiner

*Primary Examiner* — Gigi L Dubasky

(74) *Attorney, Agent, or Firm* — David H. Judson

(57) ABSTRACT

A video transmission system and method is described for dynamically dropping video frames to avoid congestion, in order to maintain overall stream quality and to prevent visual artifacts, excessive buffering or lag. One or more frame dropping strategies may be implemented, and on a per Group Of Pictures (GOP) basis. These include: (i) removal of non-referenced frames; (ii) removal of frames between consecutive P-frames (iii) removal of frames from a tail portion of GOP, while respecting dependency boundaries; (iv) dropping all frames except for one of: an I-frame, and one or more Instantaneous Decoder Refresh (IDR) frames; and (v) combinations thereof.

15 Claims, 4 Drawing Sheets

VIDEO TRANSMISSION SYSTEM AND METHOD

BACKGROUND

In video streaming over networks, maintaining consistent video quality and smooth playback is crucial for user experience. Various factors, however, such as network congestion, packet loss, jitter and fluctuating bandwidth, can compromise this experience by causing delays, buffering, artifacts and interruptions in the stream. To address these and other related issues, it is a common approach in video delivery solutions to encode video at multiple quality levels and then deliver an appropriate bitrate to a user, e.g., based on a current state of the network (available bandwidth). Another approach is to encode the video using multiple quality layers of sub-bitstreams (e.g. SVC). Both these methods require pre-processing and intensive computational power. Alternatively, it is possible to implement a feedback loop controlling the bandwidth generated by a video source encoder. This method, however, is only useful when the encoder is part of the delivery system and sends the stream to only one destination.

There remains a need to provide alternative techniques that can be used to preserve the continuity of a video that address the known deficiencies of existing approaches.

SUMMARY

This disclosure describes a video transmission system and method that is configured to dynamically drop video frames to avoid network congestion to maintain overall stream quality and to prevent visual artifacts, excessive buffering or lag. According to a representative embodiment, the approach herein is implemented on a sending side of a video transmission. It monitors network conditions, detects packet loss or congestion buildup, and then responds by selectively discarding specific frames in the video stream before or as the stream is being delivered. Preferably, the system and method are implemented with respect to video streams delivered in a compressed domain (such as in Advanced Video Encoding (AVC), High Efficiency Video Coding (HEVC) or AOMedia Video 1 (AV1) encoding schemes), namely, on a pre-compressed bitstream that has dependency between compressed frames, without the need for interacting with a video encoder, and without the need to encode the video in multiple quality levels. In a preferred embodiment, the frame-dropping process is adaptive, according to the network conditions, prioritizing the preservation of key frames and other frames essential for continuity and visual coherence. By intelligently managing which frames are sent in real-time based on network performance metrics, the described system and method reduces the bandwidth load and enhances the viewer's experience by minimizing interruptions.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the subject matter and the advantages thereof, reference is now made to the following descriptions taken in conjunction with the accompanying drawings, in which.

DETAILED DESCRIPTION

The following description assumes familiarity with video streaming techniques and technologies. As will be described, the system and method of this disclosure is adapted for use in real-time video transmission over packet-based networks/transports, such as User Datagram Protocol (UDP), Transport Control Protocol (TCP), Real-time Transport Protocol (RTP), Reliable Internet Stream Transport (RIST), Zixi™ streaming protocol, Secure Reliable Transport (SRT), WebRTC, and the like, with or without error correction mechanisms (such as Forward Error Correction (FEC), Automatic Repeat Request (ARQ) or the like), where the transmission latency is bound, and the video cannot stop to re-buffer.

According to this disclosure, a method for improving video streaming quality selectively drops video frames in response to real-time network conditions. In a representative embodiment, those network conditions are assessed through parameters such as one or more of: jitter, received packet rate, round-trip time (RTT), packet loss and other relevant network performance metrics, and combinations thereof. The techniques for assessing the network condition(s) may vary. For example, jitter is measured on a receive side according to packet arrival times and their timestamps, and reported back to the sender. A jitter estimation example for RTP is given in Internet Request for Comment (RFC) 3550. As another network condition example, packet loss is detected according to gaps in packet sequence numbers after reordering, such as in RTP, and reported back to the sender using a control message, like RTCP (RTP Control Protocol). Regardless of the technique used, when network congestion or instability is detected, the system estimates the network state (e.g., available bandwidth and thus available bitrate) based on one or more of these parameters. Alternatively, an empirical approach is used to periodically determine an optimal bitrate. After the estimated bitrate is known, the frame-dropping mechanism is then invoked.

Figure 1:
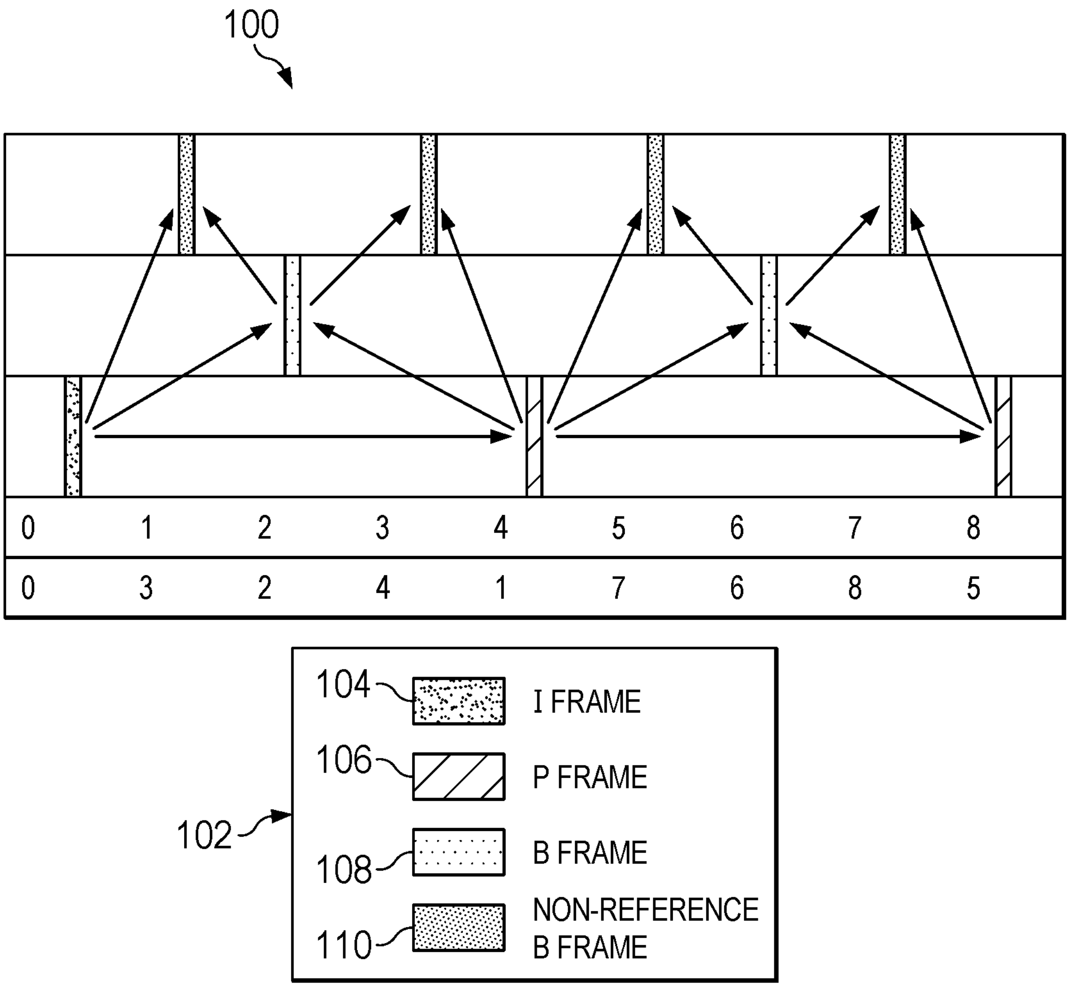
FIG. 1 depicts a known Group of Pictures (GOP) structure in a typical AVC-coded video stream.

The frame dropping mechanism is now described with reference to FIG. 1 and the follow-on drawings. By way of background, and in the context of video streaming, "GOP" refers to a Group of Pictures. GOP is a fundamental concept in video compression, defining a sequence of video frames that are encoded and decoded together, influencing video quality and streaming performance. A GOP is a set of consecutive frames within a video stream that are treated as a single unit for encoding and decoding purposes. GOPs enable efficient video compression and streaming by allowing for predictive coding (frames within a GOP can be encoded based on the content of the previous frames, thereby reducing redundancy and file size), random access (to specific points in a video, thereby enabling features such as fast-forwarding, rewind and pausing), and scalable streaming, such as adaptive bitrate (ABR) streaming, where the video quality can be adjusted based on network conditions. As depicted, an AVC-encoded video stream 100 comprises various frame types (shown in the legend 102) including I-frames, P-frames and B-frames. I-frames are also known as key frames. Each GOP typically starts with an I-frame, which is a self-contained frame that contains all the necessary information to decode it without relying on other frames. A P-frame refers to a predicted frame. P-frames are predicted based on previous I-frames or other P-frames, containing on the differences between the current frame and the predicted frame. B-frames are bi-directional frames, and they are predicted from both previous and future frames, allowing for better compression but requiring more complex decoding. As shown in FIG. 1, a representative GOP comprises an I-frame 104 followed by several P-frames 106 and B-frames 108; the next GOP (not shown) then starts with another I-frame. The arrows in the diagram show frame references (referencing). In particular, the tail of an arrow is connected to the referenced frame and the head of the arrow is the reference that depends on the referenced frame. As depicted, and in this example, some B-frames 110 are not referenced.

Figure 2:
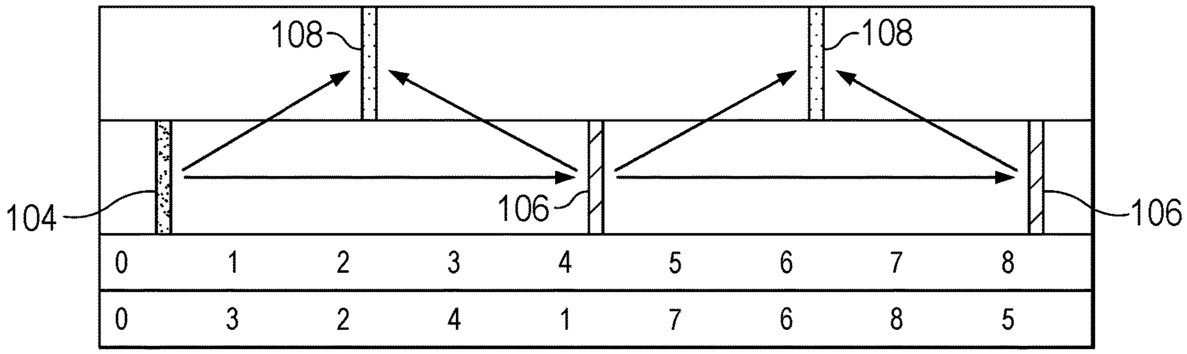
FIG. 2 depicts a result of applying a first frame-dropping strategy to the GOP depicted in FIG. 1.
Figure 3:
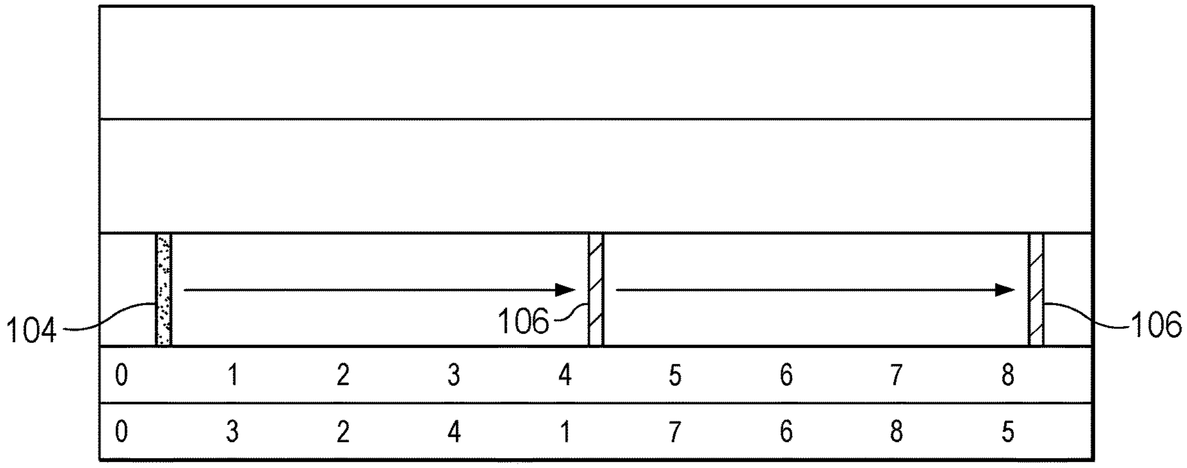
FIG. 3 depicts a result of applying a second frame-dropping strategy to the GOP.
Figure 4:
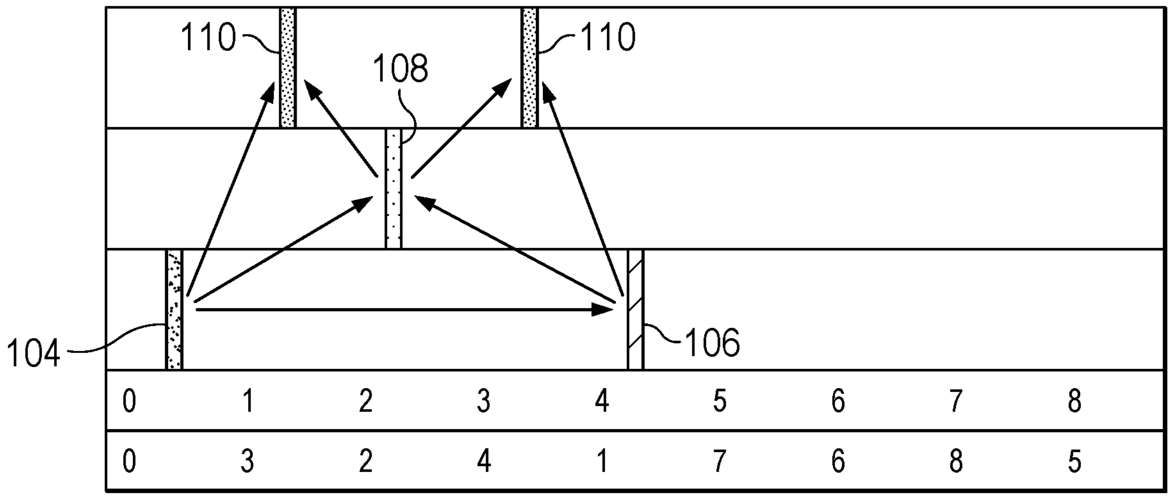
FIG. 4 depicts a result of applying a third frame-dropping strategy to the GOP.

The frame dropping mechanism and method of this disclosure preferably operates in a continuous manner according to one or more different strategies, gradually increasing the number of dropped frames as is necessary to reduce bitrate. Because dropping frames also reduces the quality of the experience of the user who is receiving and viewing the content, a goal of the mechanism is to drop as few of the frames as may be necessary, but also to gradually increase the number of frames as appropriate to balance the delivery efficiency while maintaining video content quality. FIGS. 2-4 depict various techniques that provide this operation.

As shown in FIG. 2, a first frame-dropping strategy involves dropping only non-referenced frames (the frames 110 in FIG. 1), as these frames are less critical to video continuity and are not needed for decoding other frames. Taking the GOP in FIG. 1 as the starting point, FIG. 2 depicts the frames that remain (namely, the I-frame 104, the P-frames 106, and the referenced B-frames 108) when this first strategy is implemented. The resulting user experience is akin to the user watching the video at a lower frame rate, although the bitrate drop (as compared to FIG. 1) is relatively low.

FIG. 3 depicts a second frame-dropping strategy, which involves dropping all internal frames between two (2) consecutive P-frames 106. In this example, and without intending to be limiting, the starting point is FIG. 2 (as opposed to FIG. 1). This second frame-dropping strategy thus may follow the first frame-dropping strategy, or it may be adopted directly from the GOP shown in FIG. 1 as the starting point. Taking this example, dropping all internal frames between two consecutive P-frames in the GOP leaves just the I-frame 104, and the P-frames 106. This result is a further reduced frame rate as compared to FIG. 2, thereby reducing the bitrate even lower. The video quality perceived by the end user will then be lower.

FIG. 4 depicts a third frame-dropping strategy, which involves dropping the tail frames of the GOP but without breaking frame dependencies. The starting point for the frame-dropping strategy in FIG. 4 is FIG. 1. As can be seen, following implementation of this strategy in this example scenario, only the I-frame 104, the first P-frame 106, the first B-frame 108, and several non-referenced B-frames 110 remain. This strategy provides for a controlled reduction of the frame rate at dependency boundaries helps achieve a necessary bitrate while also preserving the primary structure and coherence of the video. With this strategy, the end user video experience will have short freeze periods, but the bitrate reduction is high.

A fourth frame-dropping strategy (not depicted) is the dropping of all frames except for Instantaneous Decoder Refresh (IDR) frames. In video streaming, IDR frames are a special type of I-frame that act as a “clean slate” for the decoder, ensuring that no frame after it can reference any frame before it, facilitating random access and error resilience. By limiting the stream to IDR frames as a frame-dropping strategy, the system minimizes data transmission while ensuring that a coherent and viewable video sequence remains. This way the video experience looks like slide-show, but the bitrate may be reduced considerably.

One or more of the above-described frame-dropping strategies are selected and implemented as necessary to avoid network congestion while maintaining overall stream quality and preventing visual artifacts, excessive buffering or lag. These strategies may be carried out entirely independently of one another, or they may be implemented dependently on one another, e.g., sequentially, wherein the number of frames that are dropped increases. Thus, for example, the first frame-dropping strategy above may be implemented first, followed the second frame-dropping strategy if the first strategy is not sufficient, and so on. Different frame-dropping strategies may be applied to different GOPs (or sequences thereof). More generally, and according to the desired percentage of bitrate, one of the above-described methods is chosen so that the influence of frame dropping on video experience is minimized, while still generating the needed or desired reduction. In a preferred implementation, the strategies are implemented gradually so that each strategy yields a range of possible bitrates according to the number of dropped frames that result.

Figure 5:
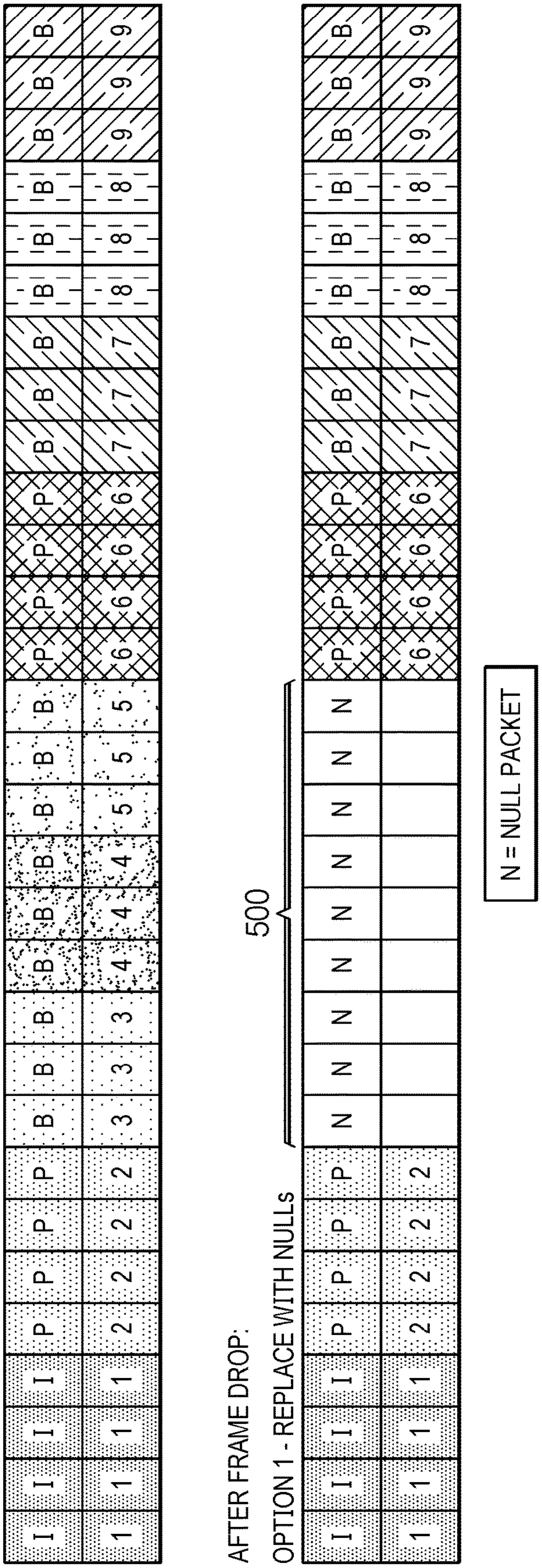
FIG. 5 depicts the inclusion of NULL packets to replace dropped packets in a stream that has been modified by applying one or more frame-dropping strategies.
Figure 6:
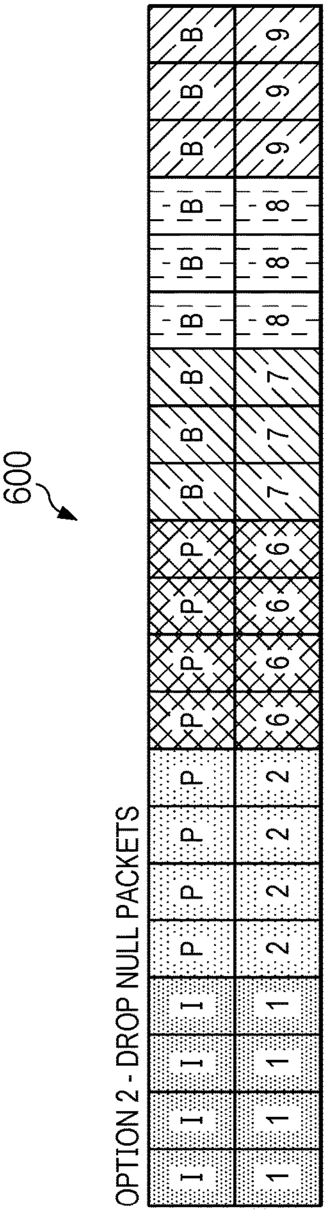
FIG. 6 depicts a further variant scheme wherein the NULL packets themselves are dropped.

In a representative implementation, the frame-dropping mechanism omits the data packets of the stream corresponding to the frames selected for dropping. As has been described, the approach reduces the data transmission rate directly, namely, by eliminating entire frames, lowering the bitrate to help alleviate network congestion. Preferably, and as depicted in FIG. 5, the dropped packets are replaced by MPEG-2 Transport Stream (MPEG-TS) NULL packets 500, which are packets inserted to maintain a constant bitrate, even if the actual data stream’s bitrate fluctuates. These packets have a PID (Packet Identifier) of 0x1FFF, and the receiver is expected to ignore their contents. Inclusion of these packets maintains the accuracy of Program Clock Reference (PCR) values in the video stream. PCR values are used to synchronize audio and video elementary streams by providing a time base for the decoder. This method reduces the effective video bit rate. If reduction of TS rate is also needed, NULL packets themselves can be omitted by using techniques of data compression, such as is depicted in in the stream 600 in FIG. 6, or by sending a variable bitrate stream (not shown). The starting point for the stream 600 is the representation shown in FIG. 5.

Thus, and according to this disclosure, a method for adaptive video streaming responds to monitored network conditions (e.g., jitter, packet loss, received packet rate, latency, latency variance, round-trip time (RTT), or the like) to determine whether there is a need to adjust a sending side bitrate (typically by reducing it, but also potentially to increase it), as well as how urgent this need may be. When a monitored condition is determined at a receiving side, receiver feedback is provided to a control mechanism in the sending side to control the determination of whether the frame dropping will be implemented and, if so, what strategy or strategies should be implemented. When frame-dropping is initiated, frames in the video being delivered are selectively dropped in a manner that minimizes impact on a continuity and quality of the remaining frames. In a typical implementation, the following strategies are implemented, preferably sequentially, prioritizing: (i) removal of non-referenced frames, then (ii) removing frames between consecutive P-frames (if they are not referenced outside of these P-frames), then (iii) progressively removing frames from a tail portion of the GOP, while respecting dependency boundaries as needed, and (iv) then dropping all frames except for the I-frame or IDR frames. In this general approach, the frame dropping mechanism attempts to retain the structural integrity of the video while preserving key frames and essential references within the GOP structure. In one further aspect, preferably the dropped frames' TS packets are replaced with NULLS and the received TS stream is compressed to reduce the total bitrate transferred. In another embodiment, and in lieu of replacing dropped packets with NULL packets, the NULL packets themselves are also discarded, thereby generating a variable bitrate stream that is delivered to the requesting client. In another variant, dropped frames are replaced with a smaller skip frame construct, e.g., by leveraging compression techniques such as skipping macroblocks in H.264 (Advanced Video Coding) or skipping coding units (CUs) in HEVC (High Efficiency Video Coding). In these techniques, a specific area of a video frame is copied directly from a previous reference frame because it has not changed enough to warrant the cost of encoding new data. Thus, and according to these representative but non-limiting examples, a particular frame dropping strategy may include replacement of a dropped frame. Relatedly, and as used herein, the notion of discarding a frame may sometimes involve replacing the discarded frame, e.g., with a skip frame.

The above monitoring and frame-dropping operations are periodically repeated in a closed loop manner to control the bitrate according to the monitored network conditions. The nature and data collected may vary, but typically example datasets include, without limitation: GOP length (in frames), I frame size (in %), P frame size (in %), B frame size (in %), non-reference frame size (in %), trial size (in %), and bitrate (BR) of a last time period (for VBR). In a representative embodiment, the control mechanism performs a callback periodically (e.g., once per second) to get a new BR percentage, and BR reduction is computed periodically (e.g., per second).

Several variants of the above-described scheme may also be realized. For example, and instead of empirically increasing or decreasing the bitrate, the system may utilize a statistical based algorithm, such as a Markov decision process, to translate between a given network condition and a given frame reduction level, to optimize a video quality objective. Further, where network communication protocols such as TCP are used for the underlying transport, a buffer level on the sending side can be used to estimate the effective transmission bitrate.

The techniques described herein facilitate zero latency frame thinning to provide significant advantages. As has been described, the solution provides a proactive and intelligent method for bitrate reduction by frame dropping in the compressed domain, in response to poor network conditions. The technique scales to multiple heterogenous destinations, and it does not require encoding the video multiple times, as in conventional adaptive bitrate solutions. The system works by selectively dropping specific frames based on their importance to the visual continuity of the video. To this end, and in a preferred approach, the system analyzes the temporal dependency between frames in the encoded video, and then prioritizes some frames, such as key frames, over other frames. Frames that are de-prioritized are then selectively dropped. This targeted frame-dropping mechanism dynamically adapts to real-time network conditions, helping to alleviate and avoid congestion without breaking the stream, ensuring a smoother and more reliable playback experience even under adverse network conditions. Frame dropping according to this disclosure also enables the delivery system to achieve rate shaping with very low computational power, as the solution also obviates stream re-encoding.

Representative Enabling Technologies

Adaptive bitrate (ABR) is a method of video streaming over HTTP where the source content is encoded at multiple bit rates. Each of the different bit rate streams are segmented into small multi-second parts, each typically a few seconds in length. In operation, a client requesting the source content downloads a manifest file that describes the available stream segments and their respective bit rates. During stream start-up, the client typically requests the segments from the lowest bit rate stream. As delivery progresses, the client may determine that the network throughput is greater than the bit rate of the downloaded segment, in which case the client requests a higher bit rate segment from the server. The client continues to request the highest bit rate segment that can be delivered efficiently, and the client can switch back to requesting a lower bit rate segment if later determines that the network throughput has again deteriorated. In the conventional HTTP-based Adaptive Streaming solution, an adaptive bitrate (ABR) algorithm operating in the client decides which bit rate segments to download, based on the current state of the network (available bandwidth).

Workflows for live video streaming are well-known. A contribution/production side comprises a source camera, encoder, and a first mile ISP or direct connect network. After capture, the encoder pushes (typically via HTTP POST) the segments of the captured media to a live origin. A live origin has an ingest layer to accept the content, and a mid-tier layer to present the content for distribution. On the distribution side, a player pulls the content chunks (typically via HTTP GET) from a video delivery server (such as an edge server in a content distribution solution), which in turn sources them from the origin. Both of these halves need to work together to transfer the chunks as quickly as possible. Typically, this transfer is done using chunked transfer encoding. In operation, the encode uses HTTP 1.1 chunked transfer encoding to send an encoded CMAF chunk to the origin for redistribution. On the distribution side, and for client-side ABR, typically the chunk's journey is pull-based and driven by the media player. The media player reads a manifest or playlist, which describes the content, calculates a point (in the media stream) at which it wishes to start playback, and then makes a request for a segment. The player requests a segment and not a chunk, because the chunks are not addressable units typically. When asked for a segment, the delivery server returns all the chunks it has for that segment in sequential order using chunked transfer encoding. As more chunks arise from the origin, they are fed to the client until eventually the complete segment has been delivered. The video server typically also caches the chunks flowing through it to build up a cached representation of the complete segment.

Further enabling technologies for use in association with the disclosed techniques may include cloud compute infrastructure and services. Cloud computing is an information technology delivery model by which shared resources, software and information are provided on-demand over a network (e.g., the publicly-routed Internet) to computers and other devices. This type of delivery model has significant advantages in that it reduces information technology costs and complexities, while at the same time improving workload optimization and service delivery. In a typical use case, an application is hosted from network-based resources and is accessible through a conventional browser or mobile application. Cloud compute resources typically are deployed and supported in data centers that run one or more network applications, typically using a virtualized architecture wherein applications run inside virtual servers, or virtual machines (VMs), which are mapped onto physical servers in the data center. The virtual machines typically run on top of a hypervisor, which allocates physical resources to the virtual machines.

Generalizing, the techniques may be implemented in a computing platform, wherein one or more functions of the computing platform are implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (laaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

According to this disclosure, the services platform described below may itself be part of the cloud compute infrastructure, or it may operate as a standalone service that executes in association with third party cloud compute services.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the subject technique is software written in a given programming language that executes on a hardware or virtual machine platform running an operating system such as Linux. The functionality may be built into other process code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including OTT streaming, Internet-based overlays, efficient utilization of Internet links, and the like, all as described above.

What is claimed follows below.

The invention claimed is:

1. A method of delivering video from a sending side to a receiving side, wherein a sequence of video frames are structured as a Group of Pictures (GOP) and encoded and decoded together, wherein the video frames comprise a set of frame types and the video is delivered as a pre-compressed bitstream that has dependency between the video frames, comprising:

as the video is delivered, monitoring one or more conditions between the sending and receiving sides, wherein the one or more conditions are: jitter, received packet rate, round-trip time (RTT), packet loss, other network performance metrics, and combinations thereof; and based on the monitoring, and upon determining that a given operating condition exists between the sending and receiving side, initiating frame dropping strategies to selectively discard specific frames of the video, wherein the frame dropping strategies comprise, sequentially: (i) removal of non-referenced frames, then (ii) removing frames between consecutive P-frames, then (iii) progressively removing frames from a tail portion of the GOP, while respecting dependency boundaries as needed, and (iv) then dropping all frames except for one of: an I-frame, and one or more Instantaneous Decoder Refresh (IDR) frames.

2. The method as described in claim 1, further including replacing at least one selectively discarded frame with one of: a NULL data packet, and a skip frame.

3. The method as described in claim 1, wherein the video stream is delivered over a network communication protocol.

4. The method as described in claim 3, wherein the network communication protocol is one of: User Datagram Protocol (UDP), Transmission Control Protocol (TCP), Real-time Transport Protocol (RTP), Reliable Internet Stream Transport (RIST), Secure Reliable Transport (SRT), WebRTC, and a proprietary UDP-based protocol.

5. The method as described in claim 1, wherein first and second frame-dropping strategies are implemented independently or dependently of one another.

6. An apparatus, comprising:

a processor; and computer memory holding computer program code, the computer program code executed by the processor to:

monitor one or more conditions between the sending and receiving sides, wherein the one or more conditions are: jitter, received packet rate, round-trip time (RTT), packet loss, other network performance metrics, and combinations thereof; and based on the monitoring, and upon determining that a given operating condition exists between the sending and receiving side, initiate frame dropping strategies to selectively discard specific frames of a video, wherein the video frames are structured as a Group of Pictures (GOP) and comprise a set of frame types, and wherein the video is delivered as a pre-compressed bitstream that has dependency between the video frames;

wherein the frame dropping strategies comprise, sequentially: (i) removal of non-referenced frames, then (ii) removing frames between consecutive P-frames, then (iii) progressively removing frames from a tail portion of the GOP, while respecting dependency boundaries as needed, and (iv) then dropping all frames except for one of: an I-frame, and one or more Instantaneous Decoder Refresh (IDR) frames.

7. The apparatus as described in claim 6, wherein the computer program code is further configured to replace a selectively discarded frame of the video.

8. The apparatus as described in claim 6, wherein the video stream is delivered over a network communication protocol.

9. The apparatus as described in claim 8, wherein the network communication protocol is one of: User Datagram Protocol (UDP), Transmission Control Protocol (TCP), Real-time Transport Protocol (RTP), Reliable Internet Stream Transport (RIST), Secure Reliable Transport (SRT), WebRTC, and a proprietary UDP-based protocol.

10. The apparatus as described in claim 6, wherein first and second frame-dropping strategies are implemented independently or dependently of one another.

11. A computer program product in a non-transitory computer-readable program media, the computer program product comprising computer program code configured for execution by one or more hardware processors to:

monitor one or more conditions between a sending side and a receiving side, wherein the one or more conditions are: jitter, received packet rate, round-trip time (RTT), packet loss, other network performance metrics, and combinations thereof; and based on the monitoring, and upon determining that a given operating condition exists between the sending and receiving side, initiate frame dropping strategies to selectively discard specific frames of the a video, wherein the video frames are structured as a Group of Pictures (GOP) and comprise a set of frame types, and wherein the video is delivered as a pre-compressed bitstream that has dependency between the video frames;

wherein the frame dropping strategies comprise, sequentially: (i) removal of non-referenced frames, then (ii) removing frames between consecutive P-frames, then (iii) progressively removing frames from a tail portion of the GOP, while respecting dependency boundaries as needed, and (iv) then dropping all frames except for one of: an I-frame, and one or more Instantaneous Decoder Refresh (IDR) frames.

12. The computer program product as described in claim 11, wherein the computer program code is further configured to replace a selectively discarded frame of the video.

13. The computer program product as described in claim 11, wherein the video stream is delivered over a network communication protocol.

14. The computer program product as described in claim 13, wherein the network communication protocol is one of: User Datagram Protocol (UDP), Transmission Control Protocol (TCP), Real-time Transport Protocol (RTP), Reliable Internet Stream Transport (RIST), Secure Reliable Transport (SRT), WebRTC, and a proprietary UDP-based protocol.

15. The computer program product as described in claim 11 wherein first and second frame-dropping strategies are implemented independently or dependently of one another.

* * * * *